July 15, 1952 C. F. PAHLER 2,603,670
STORAGE BATTERY
Filed Dec. 2, 1949
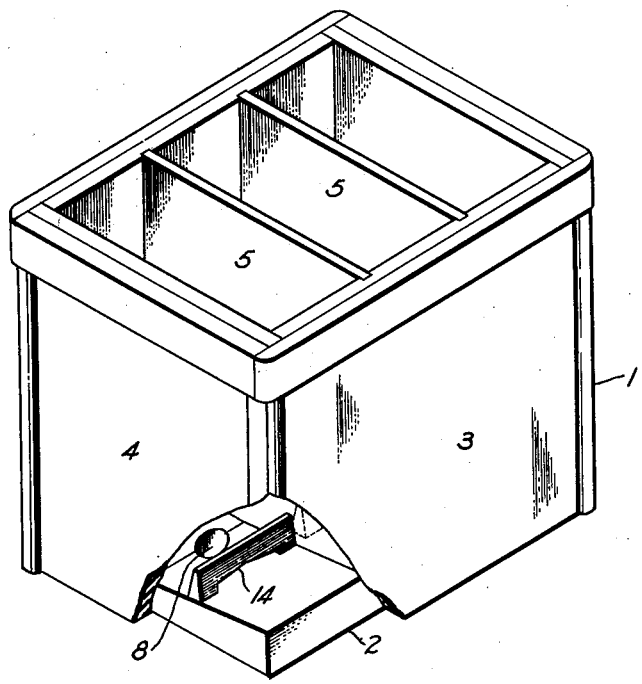
FIG_1_
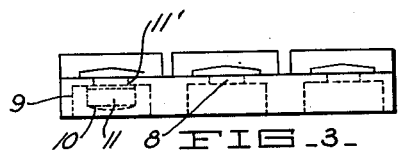
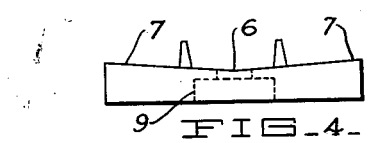
FIG_4_
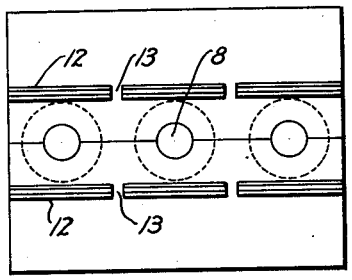
FIG_2_
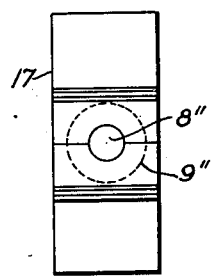
FIG_5_
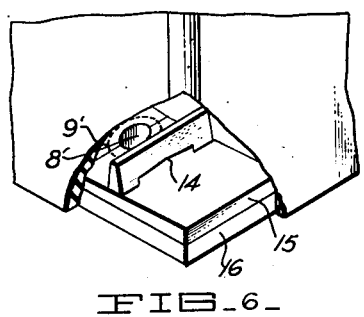
FIG_6_
INVENTOR.
Christopher F Pahler
BY
a. Schapp.
ATTORNEY Patented July 15, 1952

2,603,670

UNITED STATES PATENT OFFICE 2,603,670

STORAGE BATTERY

Christopher F. Pahler, San Francisco, Calif.

Application December 2, 1949, Serial No. 130,664

2 Claims. (Cl. 136—166)

The present invention relates to improvements in storage batteries and has particular reference to a case for a storage battery.

The principal object of the invention is to provide means for draining a storage battery from the bottom for removal of sediment and for washing operations whereby the manufacture of a battery may be simplified, shorts may be substantially prevented and the life of a battery may be greatly extended.

In conventional battery manufacture the practice is to subject the plate assembly to the pickling or curing process before it is inserted in the battery case and this treatment calls for a large outlay in equipment and facilities.

In my invention it is proposed to provide the case of the storage battery with a drain in the bottom, which allows the plate assembly to be cured or pickled after the same has been positioned in the case. After the pickling process has been completed the drain may be opened and the electrolyte used during the process drawn off, whereupon the cells may be washed from the top by water under pressure to force all the sediment from the elements and the mud rack through the bottom drain.

Upon completion of this process the drain may be closed and the case then may be filled with the permanent electrolyte.

During the life of the battery it often becomes desirable to drain off the sediment to eliminate shorts and for repair and re-fill operations, and my bottom drain for the battery is intended to greatly facilitate operations of this character.

In carrying out my invention I propose to provide a drain hole in the bottom of the battery case, with a removable plug for closing the same.

I further propose to provide means in connection with the bottom of the case for causing the sediment or the liquid carrying the same to naturally gravitate toward the drain hole.

I further propose to arrange the plug for the hole in such a manner that no part thereof projects beyond the lower face of the bottom so that the plug in no way interferes with the mounting of the battery in a cage or on the floor.

And finally, I propose, in a multi-cell battery, to arrange for a separate drain for each of the cells and for a common slope extending throughout the length of the battery for causing the sediment in each cell to gravitate to its respective drain hole.

While my invention is principally intended to form an integral part of a battery case, I also provide modifications whereby the invention may be readily applied to a conventional case.

Further objects and advantages of my invention will appear as the specification proceeds, and the novel features of my invention will be fully defined in the claims attached hereto.

The preferred form of my invention is illustrated in the accompanying drawing, in which Figure 1 shows an isometric view of a battery case made in accordance with my invention, a portion being broken away to disclose interior construction, Figure 2, a top plan view of the bottom of my battery case, Figure 3, a side view of the bottom, Figure 4, an end view of the same, Figure 5, a bottom plan view of a bottom plate adapted for insertion in a conventional battery, one of these plates being provided for in each cell, and Figure 6, a fragmentary isometric view of a battery case having my invention applied to a conventional case, a portion of the case being broken away.

While I have shown only the preferred forms of my invention, I wish to have it understood that various changes and modifications may be made within the scope of the claims attached hereto without departing from the spirit of the invention.

Referring to the drawing in detail, my battery case 1 may be of any suitable conventional construction, except for the features hereinafter pointed out, and comprises a bottom 2, two parallel sides 3, two parallel ends 4, and a conventional cover, not shown, having conventional filler holes. The case may be subdivided by means of partitions 5 to form a plurality of compartments or cells adapted to receive the plate units (not shown) in accordance with conventional practice.

The bottom 2 may be formed integral with the case or as a separate unit, as shown, to be secured to the case in any suitable manner. The bottom of this invention is preferably made somewhat thicker than in conventional practice, and its upper face is made to slope downward from the side edges toward the transverse median line 6, the slopes being shown at 7. Along the median line I provide a drain hole 8 for each cell, the slopes serving to cause sediment to gravitate toward the drain hole.

In the lower face of the case bottom I provide an enlarged recess 9 concentric with each drain hole to receive the head 10 of a plug 11, the shank 11' of the plug being adapted for threading into the drain hole for closing the latter. The recess 9 for each plug is deep enough to accommodate the entire plug head, and is large enough to allow of access to the head for screwing and unscrewing operations. Thus, no portion of the plug head extends below the bottom face of the bottom.

A series of mud racks 12 is arranged on each side of the median line to serve as rests for the plate assemblies in each cell, the racks of each series being alined with one another and spaced from the median line as shown. The mud racks in each series are spaced from one another as at 13 to receive the lower edges of the partitions 5, as shown, and all the mud racks are recessed along the bottom, as shown at 14, to allow of free flow of sediment toward the median line and toward the drain holes.

The bottom plate of my invention may be formed as an integral or permanent part of the case in original case construction. If it is desired to apply my bottom plate to a conventional case, I make the plate somewhat thinner as at 15 in Figure 6 to fit over the bottom plate 16 already present, the combined thicknesses being preferably made to correspond to that of the bottom plate 2 shown in the preferred form.

In this form the drain hole 8' is preferably formed in the added plate 15, while the recess 9' for accommodating the plug head may be formed in the lower plate 16.

In case it is desired to apply the bottom plates to the cells individually, sectional plates may be provided as at 17 in Figure 5 to fit the cells, these plates being preferably of the same thickness as the plate of Figure 6, with the drain hole indicated at 8", and the recess of the underlying plate at 9". It is apparent that the recesses 9' and 9" may extend through the entire thickness of the underlying plates.

I claim:

1. In a storage battery, a rectangular case having a bottom, side and end walls and at least one transverse partition for dividing the case into a plurality of compartments adapted to receive plate units and an electrolyte therein, said bottom having a bottom plate removably mounted thereon with the periphery of the bottom plate in close relation with the side and end walls, the upper surface of said bottom plate slanting from opposite side edges toward a median line running transversely to the partition, said bottom plate having a drain hole for each compartment located along said line, said bottom having recesses aligned with said drain holes and being of greater diameter than said drain holes, removable headed plugs for said drain holes with the heads thereof arranged in said recesses and adapted to clear the lower face of the bottom, and mud racks secured to said bottom plate in each compartment on opposite sides of said median line and spaced from the drain holes and having recesses along their bottom edges to allow mud to drain therethrough to the drain holes.

2. The combination of claim 1 wherein the mud racks on each side of the median line are spaced from the mud racks of the adjacent compartment to provide gaps adapted to receive the lower end of each partition therein.

CHRISTOPHER F. PAHLER.

REFERENCES CITED

The following references are of record in the file of this patent:

UNITED STATES PATENTS

| Number | Name | Date |
|---|---|---|
| 1,154,372 | Burritt | Sept. 21, 1915 |
| 1,257,931 | Rowell | Feb. 26, 1918 |
| 1,290,487 | Melia | Jan. 7, 1919 |
| 1,330,634 | Ivey et al. | Feb. 10, 1920 |
| 1,577,912 | Lange | Mar. 23, 1926 |

FOREIGN PATENTS

| Number | Country | Date |
|---|---|---|
| 321,697 | France | June 3, 1902 |